United States Patent
Basini et al.

(10) Patent No.: US 7,368,482 B2
(45) Date of Patent: May 6, 2008

(54) CATALYTIC PARTIAL OXIDATION PROCESS FOR PRODUCING SYNTHESIS GAS

(75) Inventors: Luca Basini, Milan (IT); Andrea Bartolini, San Giuliano Milanese (IT); Giancarlo Lupi, Spino D'Adda-Cremona (IT); Gabriele Carlo Ettore Clerici, Milan (IT)

(73) Assignees: ENI S.p.A., Rome (IT); Enitecnologie S.p.A., San Donato Milanese (IT)

( * ) Notice: Subject to any disclaimer, the term of this patent is extended or adjusted under 35 U.S.C. 154(b) by 0 days.

(21) Appl. No.: 10/571,538

(22) PCT Filed: Sep. 9, 2004

(86) PCT No.: PCT/EP2004/010169

§ 371 (c)(1),
(2), (4) Date: Jan. 17, 2007

(87) PCT Pub. No.: WO2005/023710

PCT Pub. Date: Mar. 17, 2005

(65) Prior Publication Data

US 2007/0105962 A1 May 10, 2007

(30) Foreign Application Priority Data

Sep. 11, 2003 (IT) ............. MI2003A1739

(51) Int. Cl.
C07C 27/00 (2006.01)
C07C 1/02 (2006.01)
C01B 3/26 (2006.01)
C01B 31/18 (2006.01)

(52) U.S. Cl. ............. 518/702; 518/703; 518/704; 252/373; 423/651; 423/418.2

(58) Field of Classification Search ............. 518/702, 518/703, 704; 252/373; 423/651, 418.2
See application file for complete search history.

(56) References Cited

U.S. PATENT DOCUMENTS

| 4,394,137 A | 7/1983 | Marion et al. |
| 5,744,067 A | 4/1998 | Jahnke |
| 5,856,585 A | 1/1999 | Sanfilippo et al. |
| 6,447,745 B1 * | 9/2002 | Feeley et al. ............. 423/648.1 |
| 2003/0122266 A1 | 7/2003 | Nau et al. |
| 2005/0211604 A1 | 9/2005 | Basini et al. |

FOREIGN PATENT DOCUMENTS

| EP | 0 892 760 | 1/1999 |
| WO | 99/19249 | 4/1999 |
| WO | 00/00426 | 1/2000 |

OTHER PUBLICATIONS

U.S. Appl. No. 10/571,538, filed Mar. 10, 2006, Basini, et al.

* cited by examiner

*Primary Examiner*—J. Parsa
(74) *Attorney, Agent, or Firm*—Oblon, Spivak, McClelland, Maier & Neustadt, P.C.

(57) ABSTRACT

Partial oxidation process of liquid fuels, selected from hydrocarbon and/or oxygenated compounds, together with gaseous fuels, selected from hydrocarbon compounds, natural gas and LPG, by means of a suitable catalytic system comprising the following steps: premixing the reagents and possibly heating them to temperatures ranging from 25 to 400° C., said reagents consisting of said liquid fuels, said gaseous fuels and oxygen or air or oxygen enriched air, optionally in the presence of vapor and/or $CO_2$; reacting the mixture of reagents in the catalytic zone, at inlet temperatures ranging from 50 to 500° C. and space velocities ranging from 1,000 to 1,000,000 Nl reagents/L cat×h, reaching temperatures ranging from 450 to 1350° C.

7 Claims, 2 Drawing Sheets

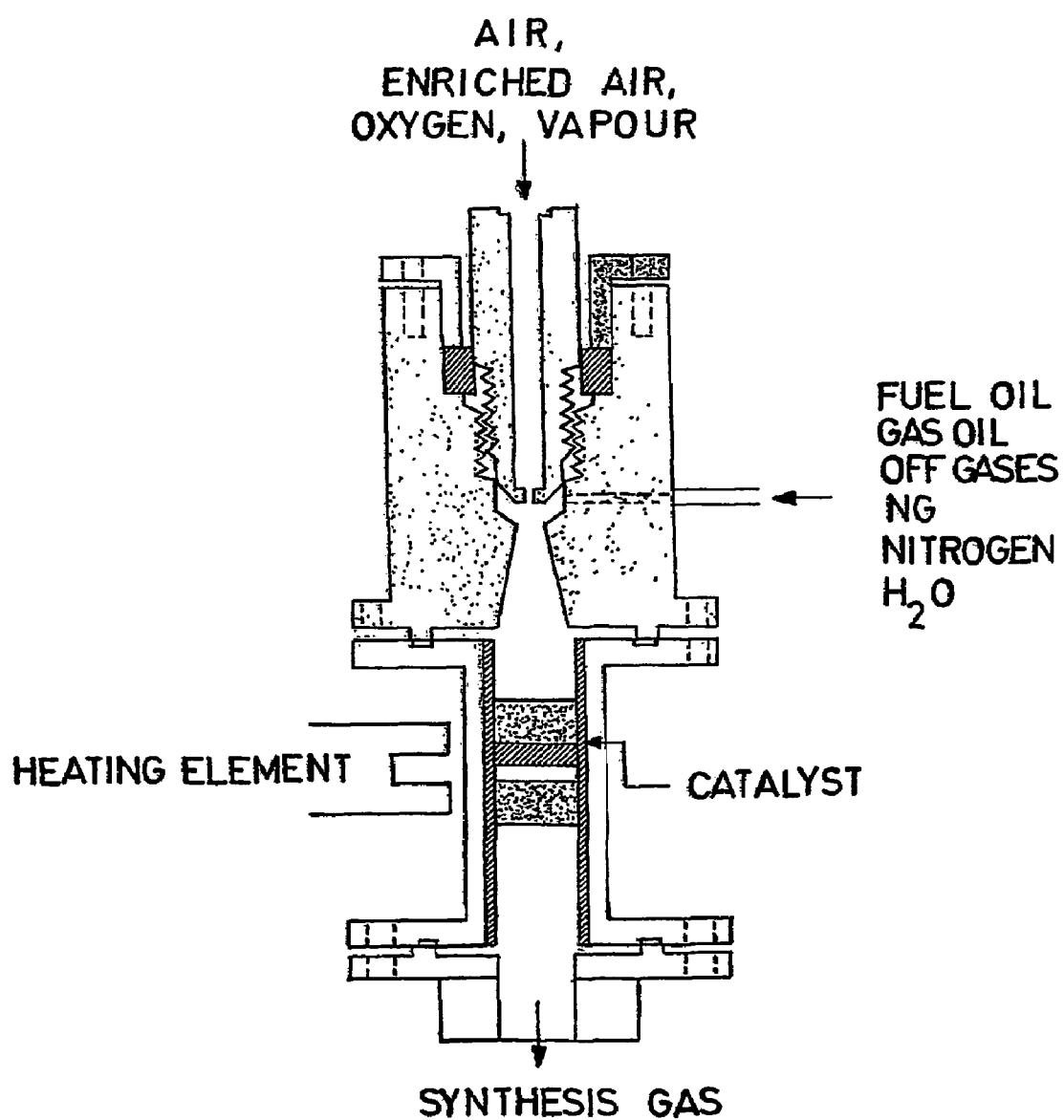

CATALYTIC PARTIAL OXIDATION PROCESS FOR PRODUCING SYNTHESIS GAS

CROSS-REFERENCE TO RELATED APPLICATION

The present application is a National Stage application of PCT application PCT/EP04/10169, filed Sep. 9, 2004.

BACKGROUND OF THE INVENTION

The present invention relates to a catalytic partial oxidation process for producing synthesis gas (mixtures containing $H_2$ and CO) via Catalytic Partial Oxidation (CPO) starting from liquid and gaseous fuels and an oxidizing stream, containing oxygen (for example, pure oxygen, air or enriched air).

The main technologies for the production of synthesis gas (prevalently consisting of a mixture of $H_2$ and CO with smaller quantities of $H_2O$, $CO_2$ and $CH_4$) can be classified as the following technologies:
a) non-catalytic partial oxidation (PO) of heavy hydrocarbons (Falsetti, J. S., Hydrocarbon Technology International, 1993, page 57)
b) steam and $CO_2$ reforming (SR) (Rostrup-Nielsen, J. R. "Catalytic Steam Reforming", in Catalysis Science and Technology, J. R. Anderson, M. Boudart Eds. Vol. 5, Springer, Berlin 1988, page 1)
c) autothermal reforming (ATR) (T. S. Christensen I. I. Primdahl, Hydrocarbon Processing, March 1994, page 39).

Steam reforming (SR) is used for converting natural gas (NG) and naphthas into synthesis gas mainly according to reactions [1-2]. Before being sent to SR, the hydrocarbon reagent is preheated and desulfurated; vapour is then added and the mixture is further preheated. The reforming takes place in an oven in which there are tubes filled with catalyst, through which the reaction mixture flows. The synthesis gas at the outlet of the tubes is rapidly cooled and can be sent to water-gas shift processes [3] and separation/purification.

$$CH_4+H_2O=CO+3H_2 \; \Delta H_{298}=206.36 \text{ kJ(mole)} \qquad [1]$$

$$C_nH_m+nH_2O=nCO+(m/2+n)H_2 \qquad [2]$$

$$CO+H_2O=CO_2+H_2 \; \Delta H_{298}=-41.16 \text{ kJ(mole)} \qquad [3]$$

The main uses of SR are:
in the production of $H_2$ for refinery uses;
in the synthesis of ammonia;
in the synthesis of methanol.

Autothermal reforming (ATR) combines sub-stoichiometric combustion reactions of NG [4] which take place in a combustion chamber, with SR and $CO_2$ reforming reactions [5] which take place in a catalytic bed situated after the combustion chamber.

$$CH_4+3/2O_2=CO+2H_2O \qquad [4]$$

$$CO_2+CH_4=2CO+2H_2 \qquad [5]$$

ATR is used for producing synthesis gas from NG for methanol synthesis, Fischer-Tropsch and carbonylation processes. The ATR technology requires the use of pure oxygen or strongly enriched air for preventing the decrease in the partial oxygen pressure in the combustion chamber from causing the formation of carbonaceous residues. Furthermore, as the lighter the hydrocarbon charge, the easier the formation of carbonaceous residues, ATR can treat only NG directly, with considerable limitations on the vapour/carbon and oxygen/carbon conditions in the feeding. If the content of C2+ in the NG is significant, a performing passage is necessary to eliminate them.

PO technologies, on the other hand, are capable of converting into synthesis gas, a wide range of hydrocarbon charges, from NG to gas oils, from heavy residues to coal. The process can be represented with the reactions [6-7].

$$CH_4+\tfrac{1}{2}O_2=CO+2 \; H_2 \Delta H_{298}=-35.69 \text{ kJ/mole} \qquad [6]$$

$$C_nH_m+n/2O_2=nCO+m/2H_2 \qquad [7]$$

When the use of partial oxidation is extended to the oxidation of heavy residues and coal, these are gasification processes which can be represented by the equations [8, 9]

$$C+\tfrac{1}{2}O_2=CO \; \Delta H_{298}=-110.62 \text{ kJ/mole} \qquad [8]$$

$$C+H_2O=CO+H_2 \; \Delta H_{298}=131.38 \text{ kJ/mole} \qquad [9]$$

The PO technology, however, has a higher energy consumption than that of SR and STR catalytic technologies and also requires the use of complex and costly equipment. The absence of a catalyst in the area below the combustion chamber causes, in fact, much higher temperatures at the outlet of the reactors (around 1400° C.) from which it is difficult to effectively recuperate the heat. The most advantageous PO applications are therefore those which transform hydrocarbon charges consisting of heavy hydrocarbon residues from oil processing which cannot be transformed into synthesis gas by means of the SR and STR catalytic technologies. The PO technology can use air, enriched air or oxygen as oxidizing agent but it is preferable to use pure oxygen to limit the formation of carbonaceous residues which, although tolerated, are formed in a percentage which increases with the increase in the $N_2$ content in the reagent mixture and the lower the vapour/carbon and H/C ratios in the hydrocarbon charge. The carbonaceous residues, however, are eliminated with washing operations of the synthesis gas. Due to the high temperatures in the combustion chamber, the presence of $N_2$ subsequently causes the formation of $NO_x$.

A technology which is still not widely used but which is frequently the object of R&D projects is catalytic partial oxidation (CPO) with a short contact time. This allows the production of synthesis gas from air and from a large number of hydrocarbon reagents without the formation of undesired by-products such as carbonaceous residues and $NO_x$.

CPO with a low contact time is based on the reaction $$CH_4+\tfrac{1}{2}O_2=CO+2 \; H_2\Delta H°=-36 \text{ kJ/mole} \qquad [10]$$

slightly exothermic. The reaction was studied for converting NG into synthesis gas also using low vapour/carbon, oxygen/carbon ratios and using air, enriched air or oxygen as oxidizing agent. This process allows most of the reactions leading to the formation of carbonaceous residues to be avoided. As the reactions take place at temperatures lower than 1400° C., $NO_x$ is not formed even if air is used as oxidizing agent.

The process for the production of synthesis gas with a short contact time is described in various documents of scientific and patent literature: (a) M. Bizzi, L. Basini, G. Saracco, V. Specchia, Ind. Eng. Chem. Res. (2003), 42, 62-71 "Modelling a transport phenomena limited reactivity in short contact time catalytic partial oxidation"; (b) L. Basini, K. Aasberg-Petersen, A. Guarinoni, M. Oestberg, Catalysis Today (2001) 64, 9-20 "Catalytic Partial Oxidation of Natural Gas at Elevated Pressure and Low Residence Time"; (c) H. Hickman, L. D. Schmidt, J. Catal. 138 (1992) 267; (d) D. Hichman, L. D. Schmidt Science, 259 (1993) 343; (e) L. Basini, G. Donati WO 97/37929; (f) Sanfilippo, Domenico; Basini, Luca; Marchionna, Mario; EP-640559; (g) D. Schaddenhorst, R. J. Shoonebeek; WO 00/00426; (h) K. L. Hohn, L. D. Schmidt, S. Reyes, J. S. Freeley, WO 01/32556; (i) A. M. Gaffney, R. Songer, R. Ostwald, D. Corbin, WO 01/36323.

SUMMARY OF THE INVENTION

We have found a short contact time CPO process for the production of synthesis gas from mixtures of both gaseous fuels (hydrocarbon compounds, natural gas and/or LPG) and liquid fuels (hydrocarbon and/or oxygenated compounds) and also possibly from oil distillation heavy residues also containing sulfurated compounds.

BRIEF DESCRIPTION OF THE DRAWINGS

FIG. 2 is a schematic of a reactor used in an embodiment of the present invention is Example 3.

DETAILED DESCRIPTION OF THE INVENTION

Figure 1:
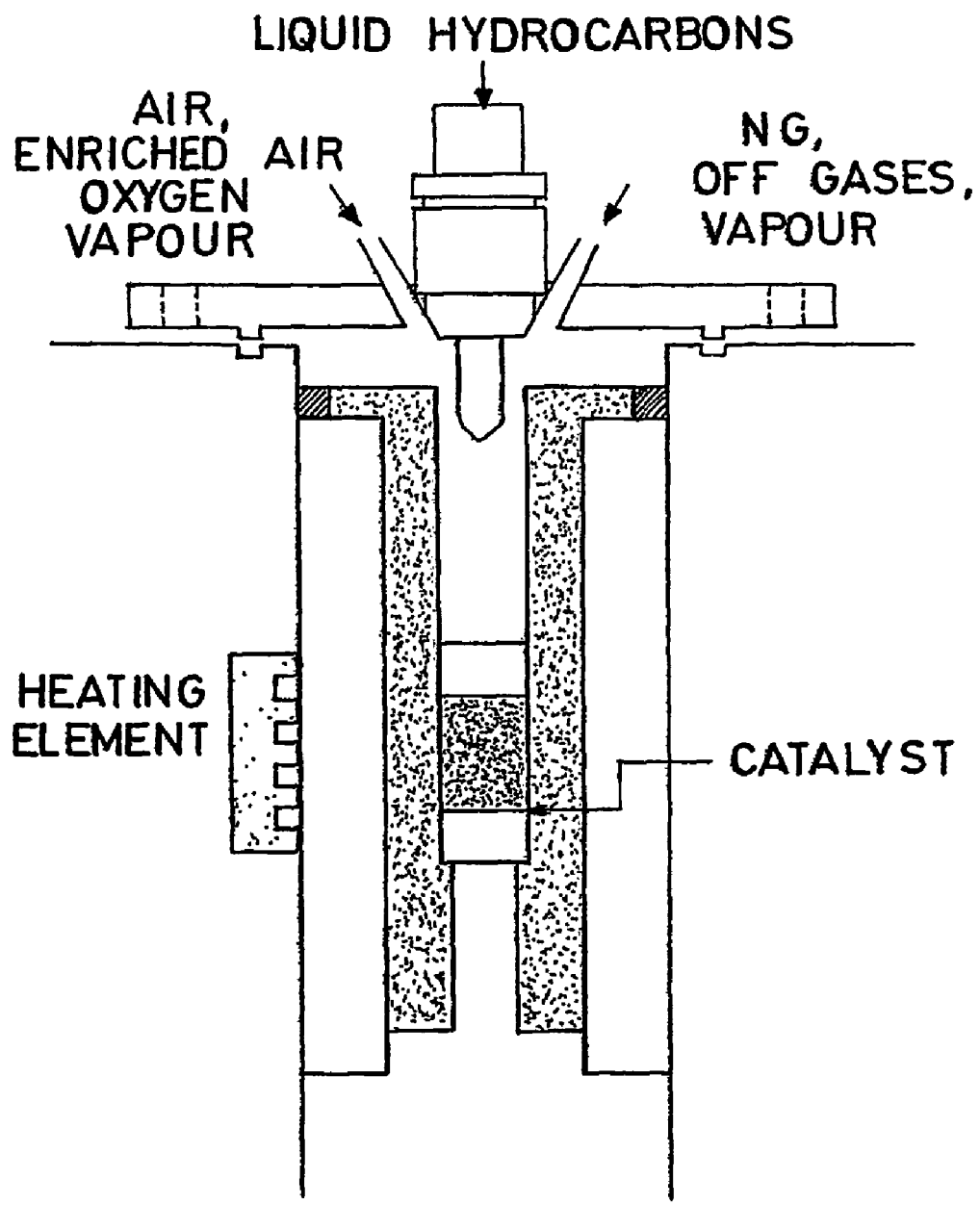
FIG. 1 is a schematic of a reactor used in an embodiment of the present invention in Example 1.

In particular, with respect to liquid fuels, preferred hydrocarbon compounds are gasolines, naphthas, gas oils and medium distillates, preferred oxygenated compounds are alcohols (for example methanol) and ethers (for example DME).

The process described is also capable of transforming hydrocarbon fractions which cannot be used by other known catalytic technologies (SR and ATR) and which can only be converted into synthesis gas by means of the PO technology but with high energy consumptions and investment costs.

By means of short contact time CPO processes, it has also been possible to transform liquid hydrocarbons with a high content of aromatics and sulfur into synthesis gas avoiding the formation of carbonaceous residues and $NO_x$, using air, enriched air or oxygen as oxidizing agents. The process conditions under which these transformations were effected allow a much higher energy efficiency than that of non-catalytic PO. The characteristics of the reactors used allow technological solutions to be defined with reduced investment costs with respect to those of non-catalytic PO processes.

The characteristics of the CPO process described herein are also suitable for being used to treat different refinery streams, either pure or mixed with each other, to produce $H_2$. This possibility is useful as in refineries there is both the necessity of increasing the availability of hydrogen for carrying out hydro-treatment processes and also the necessity of upgrading various hydrocarbon streams such as refinery gases, low-quality gas oils with a high content of aromatics, such as Light Cycle Oils (LCO) and Heavy Cycle Oils (HCO) and fuel oils. The refinery gases are typically combusted whereas LCO and HCO gas oils having a high sulfur content are mainly used as fuels or fluidizing agents of fuel oils.

The only technology so far capable of using all these hydrocarbon charges is PO. It should be pointed out, however, that the production of synthesis gas from gas oils in general and from LCO and HCO in particular (which have quantities of aromatics even higher than 70% by weight and H/C ratios also lower than 1), requires the use of pure oxygen or strongly enriched air and considerable quantities of vapour to reduce the formation of carbonaceous residues. Vapour is also necessary for increasing the $H_2$ content in the synthesis gas produced which would otherwise prevalently contain CO. These characteristics create high investment and operating costs which do not make the production of hydrogen from these refinery streams economical.

Short contact time CPO processes, on the other hand, allow synthesis gas and hydrogen to be produced with economically sustainable costs also starting from heavy gas oils with a high content of aromatics, and from fuel oils.

CPO processes can use either oxygen, enriched air or air and, also in the absence of vapour, the formation of carbonaceous compounds in the synthesis gas which is produced at much lower temperatures than those of PO processes, is strongly reduced, thus improving the efficiency of thermal recoveries and allowing the use of exchange systems at a lower cost.

CPO processes also enable the use of gaseous and liquid hydrocarbon mixtures also containing sulfurated compounds. The sulfurated compounds are then converted into $H_2S$ and can be easily removed from the synthesis gas produced thus avoiding further costly operations for the hydrodesulfuration of the reagents.

The process, object of the present invention, for the partial oxidation of liquid fuels, selected from hydrocarbon and/or oxygenated compounds, together with gaseous fuels, selected from hydrocarbon compounds, natural gas and LPG, comprises the following steps:

premixing and optionally heating to temperatures ranging from 25 to 400° C., the reagents consisting of said liquid hydrocarbons, said gaseous hydrocarbons and oxygen or air or oxygen enriched air, optionally in the presence of vapour and/or $CO_2$;

reacting the mixture of reagents in the catalytic zone, at inlet temperatures ranging from 50 to 500° C. and space velocities ranging from 1000 to 1,000,000 Nl reagents/L cat×h, reaching temperatures at the outlet of the catalytic bed ranging from 450 to 1350° C.

The liquid fuels can be atomized and/or mixed in the stream of gaseous fuels and in the oxidizing stream by means of suitable devices (Venturi systems, injection systems, etc.).

Furthermore, solid streams consisting of oil distillation heavy residues can also be used in the mixture: before being mixed with the reaction mixture, these heavy residues are preferably fluidized by means of thermal treatment or by dilution with suitable gas oils.

The catalytic system preferably consists of oxides, oxynitrides or nitrides, carbides or oxycarbides containing one or more elements selected from Rh, Ru, Ir, Pt, Ni, Fe, Co and Mo.

The content of metals in the oxides, nitrides or oxynitrides is preferably in a quantity ranging from 0.05 to 15% by weight.

The nitrides can consist of:

AlN, $CO_3N$, $Cr_2N$, $Fe_4N$, $Mn_4N$, MoN, TiN, WN, VN
silicon nitride $Si_3N_4$ (F. K. Van Dijen, A. Kerber, U. Voigt, W. Pfeiffer, M. Schulze, in "Key Engineering Materials" Vols. 89-91, M. J. Hofmann P. F. Becher and G. Petzow Eds. Trans Tech. 1994, pages 19-28); H. Lange, G. Wotting H. Winter, Angew. Chem. 1991, 103, 1606)
Si—N—B systems or Si—B—N—C systems such as $Si_3B_3N_7$ and Engl. 1997, 36, 328)

systems consisting of layers of aluminum nitrides deposited on oxide carriers by means of atomic layer epitaxy or chemical vapour deposition with processes described in the following references: (M. E. Bartram, T. A. Michalske, J. W. Rogers, T. M. Mayer Chem. Mater. 1991, 3, 353; M. E. Bartram, T. A. Michalscke, J. W. Rogers, R. T. Paine. Chem. Mater., 1993, 5, 1424; C. Soto, V. Boiadjiev, W. T. Tysoe, Chem. Mater. 1996, 8, 2359).

The ratio between vapour moles/moles of hydrocarbon carbon atoms (vapour/C) at the inlet of the catalytic zone preferably ranges from 0 to 2; more preferably from 0.1 to 1.0 and the ratio between the molecular oxygen moles/moles of hydrocarbon carbon atoms ($O_2/C$) preferably ranges from 0.1 to 0.8, more preferably from 0.25 to 0.75.

The catalysts, moreover, can be formed as pellets or as spongy or honeycomb monoliths.

A method for obtaining the catalysts consists in immersing the particles or monoliths forming the carriers of the catalyst in an organic solution of an organometallic compound such as, for example, $Rh_4(CO)_{12}$, $Rh_6(CO)_{16}$, $Rh(CH_3COCHCOCH_3)_3$, $Ru_3(CO)_{12}$, $Ir_4(CO)_{12}$, $Ir(CH_3COCHCOCH_3)_3$, $Pt(CH_3COCHCOCH_3)_2$, $Co_4(CO)_{12}$, $[C_5H_5Fe(CO)_2]_2$, $Ni(CH_3COCHCOCH_3)_2$.

The interaction between the organometallic molecules dissolved in the organic solvent and the active sites of the oxide, nitride or oxynitride, carbide or oxycarbide, causes its decomposition and the anchorage of the metallic species on the surface of the solid. The solvent can then be removed and the solid dried. The material thus obtained is already capable of being used in CPO reactions without any further thermal calcination treatment.

In addition to this method, we have verified that the catalysts can also be produced with methods using aqueous solutions of inorganic salts of noble and/or transition metals, such as, for example, nitrates, chlorides and oxalates. In this case, the aqueous solution is deposited on the carriers until conditions of incipient wettability are reached. The system thus obtained is then dried and calcined at temperature conditions which decompose the inorganic precursor.

The process described above using a catalytic system preferably in the form of pellets, can give further improved results when it is carried out with special equipment, i.e. the reactor claimed by the same applicant in patent application [MI96/A000690], which allows the catalytic partial oxidation reactions to be carried out at high pressures (10-50 atm) and space velocities (50,000-5,000,000 Nl/kg cat/h), maintaining the linear rates of the reagent gases at values higher than the flame rates, particularly in the inlet area of the catalytic bed, also avoiding pressure drops due to the expansion of the gaseous reaction mixture.

Further details on said equipment are provided in both the patent application cited above [MI96/A000690] and also in patent application MI98A000440 filed by the same applicant.

Some examples are provided which however should not be considered as limiting the scope of the present invention.

EXAMPLE 1

A reactor is used as schematized in FIG. 1, containing an inlet zone of a liquid hydrocarbon, consisting of an injector analogous to that adopted in an internal combustion engine whereby the liquid is atomized in an underlying area into which streams of Air, Natural Gas and vapour are also fed. The stream thus obtained is passed through a thermal screen consisting of spheres of ceramic material which prevent the radiating heat coming from the catalytic zone from being diffused in the mixture of reagents.

The catalytic bed consists of spheres with a central nucleus of alpha-alumina on which an external layer of mixed Aluminum and Magnesium oxides is generated. Metallic salts of Ni and Ru are deposited on this outer layer by means of an incipient wettability impregnation process. The spheres are subsequently dried and calcined at a high temperature, decomposing the metallic salts. After calcination, the material contains metallic aggregates of Ni and Ru whose weight percentages are 2 and 0.5% respectively.

Downstream of the catalytic bed, there is a rapid cooling system of the gas which avoids disproportioning reactions of the carbon monoxide with the formation of carbonaceous residues and $CO_2$.

The reactions are triggered by selectively heating the catalytic zone at 5 ATM with localized electric resistances in the surrounding refractory wall and feeding firstly a stream of NG and subsequently Air. When the $O_2/C$ ratio in the stream of reagents has reached the value of 0.6 v/v, a LCO (Light Cycle Oil) gas oil is fed, with the composition described in Table 1 and vapour.

TABLE 1

| ANALYSIS | METHOD | U.M. | LCO (DO 693) |
|---|---|---|---|
| Sulfur | ASTM D-1552 | w % | 0.83 |
| Nitrogen | ASTM D-4629 | ppm | 558 |
| Density @ 15° C. | ASTM D-4052 | g/cm | 0.9688 |
| AROMATICS (HPLC) | EN 12916/00 | | |
| Mono-aromatics | | w % | 6.5 |
| Di-aromatics | | w % | 54.6 |
| Tri-aromatics | | w % | 10.1 |
| Poly-aromatics | | w % | 64.7 |
| Total aromatics | | w % | 71.2 |

The reagent streams are then adjusted so as to obtain, under stationary conditions, an $O_2/C$ ratio=0.70 v/v, a Vapor/C ratio=0.27 and an equivalent quantity of carbon atoms in the streams of NG and LCO. Finally, the pressure of the reaction environment is raised to 10 Atm.

Once stationary conditions have been reached, the composition of the synthesis gas obtained corresponds to that specified in Table 2.

TABLE 2

| | Volume % |
|---|---|
| $CH_4$ | 1.65 |
| CO | 15.50 |
| $CO_2$ | 3.71 |
| $C_2H_4$ | 0.03 |
| $C_2H_2$ | 0.00 |
| $C_3H_6$ | 0.01 |
| $C_3H_8$ | 0.00 |
| $C_4$ | 0.01 |
| $C_5$ | 0.00 |
| $C_{6+}$ | 0.00 |
| $N_2$ | 63.47 |
| $H_2$ | 15.55 |

EXAMPLE 2

The same device adopted in Example 1 was used for converting a mixture of NG, LCO, Air and Vapour into synthesis gas with a catalyst consisting of an alpha-Alumina carrier on which first an outer layer of Mg and Al oxides and subsequently salts of Ni and Rh were deposited with the method described in Example 1, in order to obtain, after drying and calcination weight percentages of the metals corresponding to 1.5 and 0.5% respectively.

The reagent mixture had the following overall feeding ratios $O_2/C=0.65$ v/v, Vapor/C=0.27 v/v. Furthermore, the streams of NG and LCO reagents were such as to feed within the time unit the same number of carbon atoms to the reaction zone. The reactions were triggered with the procedure already described in Example 1 at 5 ATM and, once the stationary conditions had been reached, the pressure was subsequently raised to 10 ATM. The composition of the synthesis gas obtained is specified in Table 3.

TABLE 3

|  | Volume % |
|---|---|
| $CH_4$ | 2.99 |
| CO | 15.52 |
| $CO_2$ | 3.38 |
| $C_2H_4$ | 0.27 |
| $C_2H_2$ | 0.09 |
| $C_3H_6$ | 0.13 |
| $C_3H_8$ | 0.01 |
| $C_4$ | 0.00 |
| $C_5$ | 0.00 |
| $C_{6+}$ | 0.00 |
| $N_2$ | 62.26 |
| $H_2$ | 15.15 |

EXAMPLE 3

In this case, a device was used in which the hydrocarbon reagent was atomized by exploiting the Venturi effect in a system schematized in FIG. 2.

The liquid hydrocarbon charge was, in this case, obtained by mixing a fuel oil (BTZ) containing less than 200 ppm of Ni and V whose characteristics are included in Table 4 with 20% by volume of LCO gas oil whose composition is specified in Table 1. The catalyst used was prepared by depositing, on a spheroidal alpha-Alumina carrier modified with an outer layer of Al and Mg oxides, active metals consisting of Ni, Co, Rh starting from an organic solution of $Rh_4(CO)_{12}$, $Co_4(CO)_{12}$, $Ni(CH_3COCHCOCH_3)_2$.

TABLE 4

| ANALYSIS | METHOD | U.M. | BTZ |
|---|---|---|---|
| Sulfur | ASTM D-1552 | w % | 1.2 |
| Density @ 15° C. | ASTM D-4052 | g/cm | 0.9686 |
| AROMATICS | EN 12916/00 | w % | 85 |

The composition at the inlet of the reactor into which the BTZ, LCO, NG, vapour and air were fed, was defined so that: a) Vapour/C=0.5 v/v, b) $O_2/C=0.65$ v/v, and the number of carbon atoms in the gaseous stream was equal to the number of carbon atoms in the LCO+BTZ stream.

The composition of synthesis gas at the outlet of the reactor is included in Table 5.

TABLE 5

|  | Volume % |
|---|---|
| $CH_4$ | 2.52 |
| CO | 16.87 |
| $CO_2$ | 3.81 |

TABLE 5-continued

|  | Volume % |
|---|---|
| $C_2H_4$ | 0.25 |
| $C_2H_2$ | 0.03 |
| $C_3H_6$ | 0.09 |
| $C_3H_8$ | 0.01 |
| $C_4$ | 0.01 |
| $C_5$ | 0.00 |
| $C_{6+}$ | 0.00 |
| $N_2$ | 62.65 |
| $H_2$ | 14.32 |

EXAMPLE 4

In this case, the device adopted in Examples 1-3 was used for testing, with a catalyst containing 0.5% of Rh and 3% by weight of Ni deposited on a carrier of silicon nitride, reforming reactions of a mixture of LCO and a refinery gas whose composition is specified in Table 6. The feeding ratios were established so that $O_2/C=0.56$ v/v, a Vapor/C=0.2 v/v and the carbon moles contained in the LCO stream corresponded to the carbon moles contained in the refinery gas.

TABLE 6

|  | Volume % |
|---|---|
| $H_2$ | 44.7 |
| $C_1$ | 24.3 |
| $C_2$ | 15.0 |
| $C_3$ | 8.0 |
| $C_4$ | 7.0 |
| $C_{5+}$ | 1.0 |

The synthesis gas obtained had the composition indicated in Table 7.

TABLE 7

|  | Volume % |
|---|---|
| $CH_4$ | 0.67 |
| CO | 16.75 |
| $CO_2$ | 2.96 |
| $C_2H_4$ | 0 |
| $C_2H_2$ | 0 |
| $C_3H_6$ | 0 |
| $C_3H_8$ | 0 |
| $C_4$ | 0 |
| $C_5$ | 0 |
| $C_{6+}$ | 0 |
| $N_2$ | 45.68 |
| $H_2$ | 29.41 |

The invention claimed is:

1. A process for the catalytic partial oxidation of liquid fuels, selected from low quality gas oils with a high content of aromatics and sulphur, together with gaseous fuels, selected from refinery gases, natural gas, and/or LPG, by means of a suitable catalytic system comprising the following steps:

premixing and optionally heating to temperatures ranging from 25 to 400° C. the reagents consisting of said liquid hydrocarbons, said gaseous hydrocarbons and oxygen or air or oxygen enriched air, optionally in the presence of vapour and/or $CO_2$;

reacting the mixture of reagents in the catalytic zone, at inlet temperatures ranging from 50 to 500° C. and space velocities ranging from 1000 to 1,000,000 Nl reagents/L cat×h, reaching temperatures at the outlet of the catalytic bed ranging from 450 to 1350° C.

2. The process according to claim 1, wherein, heavy residues from oil distillation are also present among the reagents.

3. The process according to claim 2, wherein the heavy residues from oil distillation are mixed with the reagents after being fluidized by means of thermal treatment or by dilution with suitable gas oils.

4. The process according to claim 1, wherein the catalytic system consists of oxides, oxynitrides, nitrides, carbides and/or oxycarbides containing one or more elements selected from Rh, Ru, Ir, Pt, Ni, Fe, Co and Mo.

5. The process according to claim 1, wherein, among the reagents, the ratio between vapour moles/moles of hydrocarbon carbon atoms at the inlet of the catalytic zone ranges from 0 to 2 and the ratio between oxygen moles/moles of hydrocarbon carbon atoms ranges from 0.1 to 0.8.

6. The process according to claim 1, wherein, among the reagents, the ratio between vapour moles/moles of hydrocarbon carbon atoms at the inlet of the catalytic zone ranges from 0.1 to 1 and the ratio between oxygen moles/moles of hydrocarbon carbon atoms ranges from 0.25 to 0.75.

7. The process according to claim 1, wherein low-quality gas oils with a high content of aromatics are selected from Light Cycle Oils (LCO) and Heavy Cycle Oils (HCO).

* * * * *